United States Patent

Yae

[11] Patent Number: 5,764,013
[45] Date of Patent: Jun. 9, 1998

[54] PLATE MATERIAL CONVEYANCE ROBOT

[75] Inventor: Masanobu Yae, Hashima, Japan

[73] Assignee: Daitron Technology Co., Ltd., Osaka, Japan

[21] Appl. No.: 805,758

[22] Filed: Feb. 25, 1997

Related U.S. Application Data

[63] Continuation of Ser. No. 435,385, May 5, 1995, abandoned.

[30] Foreign Application Priority Data

May 11, 1994 [JP] Japan .................................. 6-097254

[51] Int. Cl.[6] .............................. B25J 9/18; B65G 11/00
[52] U.S. Cl. .................... 318/568.11; 318/568.2; 318/568.21; 318/625; 414/752
[58] Field of Search ................ 318/868.11, 868.19, 318/868.2, 868.21, 574, 625; 414/733, 744.1, 744.2, 749–752

[56] References Cited

U.S. PATENT DOCUMENTS

| | | | |
|---|---|---|---|
| 4,341,502 | 7/1982 | Makino | 414/744.3 |
| 4,428,710 | 1/1984 | Grisebach et al. | 414/590 |
| 4,488,242 | 12/1984 | Tabata et al. | 364/513 |
| 4,756,662 | 7/1988 | Tanie et al. | 414/729 |
| 4,897,015 | 1/1990 | Abbe et al. | 414/744.8 |
| 5,055,755 | 10/1991 | Ozawa et al. | 318/568.11 |
| 5,064,340 | 11/1991 | Genov et al. | 414/744.5 |
| 5,085,556 | 2/1992 | Ohtomi | 414/744.3 |
| 5,326,218 | 7/1994 | Fallas | 414/733 |
| 5,456,561 | 10/1995 | Podvje et al. | 414/225 |

*Primary Examiner*—Brian Sircus
*Attorney, Agent, or Firm*—Armstrong, Westerman, Hattori, McLeland & Naughton

[57] ABSTRACT

A small sized, low cost plate conveyance robot includes first and second driving motors on first and second link mechanisms respectively. The rotation angles of three driving motors are simultaneously and sequentially controlled to allow the third arm to make a rectilinear motion by a predetermined distance L in a fixed direction in a horizontal plane in order to take a plate material to be conveyed into the suction hand portion of the third arm as well as to take out the plate from the suction hand portion of the third arm after finishing the given conveyance operation.

7 Claims, 5 Drawing Sheets

PLATE MATERIAL CONVEYANCE ROBOT

This application is a continuation of application Ser. No. 08/435,385 filed May 5, 1995, now abandoned.

FIELD OF THE INVENTION

The present invention relates to a plate material conveyance robot, particularly, a three joint type plate material conveyance robot or manipulator to be used for loading or unloading a plate material, especially, a rectangular plate material such as a rectangular glass plate for liquid crystal display device (LCD) at a fixed stage in the manufacturing line of such LCD.

BACKGROUND OF THE INVENTION

For example, in a automation manufacturing line for LCD, when, as shown in FIG. 6, for example, two plate cassettes 3 each of which contains a plurality, e.g. 25 sheets, of rectangular glass plates or substrates 7 (shown in FIG. 7) are brought into the fixed places near the entrance of the LCD-glass plate processing stage 1 by an unattended automatic carriage 2 respectively. At the discharging end of the stage 1, the glass plates 7 contained in one of the cassettes 3 are sequentially loaded onto or moved into the entrance area of the processing stage 1 one by one from the cassette 3 by using a plate material conveyance robot or manipulator 4 installed between the places provided with the cassettes 3 and the charging end of the processing stage 1. The step of the two plate cassettes 3 being conveyed in as illustrated above is in order to prevent unexpected occurrence of intermittent supplying the glass plate 7 to be processed, because in general a given processing of the LCD is carried out in the conveyer type processing stage 1.

On the other hand, at the discharging end of the processing stage 1, there are disposed two plate cassettes 5 near the discharging area of the stage 1 in fixed locations for accommodating the processed glass plates 7, in the same manner as in the charging area of the processing stage 1. By another plate material conveyance robot 4 which is installed at an appropriate position between the places supplied with two unloaded plate cassettes 5 for accommodating the processed plate material and the delivery end of the processing stage 1, the processed glass plates 7 are unloaded or taken out one by one from the discharging end of the processing stage 1. Each of the processed plates 7 is conveyed into either one plate cassette 5. When the cassette 5 having stored fully with the processed glass substrates 7, it is replace by the new unloaded cassette and then carried out by the unattendant automatic carriage 2.

Conventionally, there has been known, as a LCD-glass plate material conveyance robot or manipulator 4, a so-called three joint type one having three arms, as shown in FIG. 8 and FIG. 9. The type of the plate material conveyance robot 4 has a vertical main shaft 11 mounted on a non-illustrated base of a supporting frame 10. The main shaft 11 is turned by a non-illustrated electric servo motor. The base is designed to be rectilinearly moved in the direction of the axis Y in a plane in FIG. 9, through the ball screw or rack type moving mechanism using a conventional non-illustrated servo motor. On the top end of the main shaft 11, one end of the first arm 12 is carried rotatively in a horizontal position, and the other end of the arm 12 is linked to one end of the second arm 14 through a first link mechanism 13. The other end of the second arm 14 is linked to the other end of the third arm 16 through a second link mechanism 15. The third arm 16 is fabricated from a flat plate material, said third arm 16 having a suction hand portion at the free end thereof and a plurality of vacuum suction holes arranged in tandem on the upper surface of the suction hand portion. The vacuum suction holes are connected through a suction piping to a vacuum pressure source. When a rectangular glass plate to be conveyed being brought into contact with the upper surface of the hand portion of the third arm 16, the vacuum holes of the suction hand portion are applied with a vacuum pressure through the piping by a known method to attract the plate 7 onto the upper surface of the suction hand portion of the third arm 16.

The above main shaft 11 and the rotary shafts of the first and second link mechanisms 13 and 15 are respectively provided with the schematically illustrated pulleys 17, 18, and 19, these pulleys being coupled to each other by belts 20, 21 in the known way. By controlling rotation of the main shaft 11 with the drive control mechanism by the known method, as shown in the real line in FIG. 9, from the position where the linked first and second arms 12 and 14 and the third arm 16 which is situated in parallel with the axis X are fully elongated in a straight line, the arms move into the shrunk or folded position, as shown in the broken line. Further, the above ball screw type moving mechanism, servo motor mechanism for driving the main shaft, pulley mechanism and vacuum mechanism of the suction head are, for example, automatically controlled by a non-illustrated electronic control unit using a microcomputer. The above vertical main shaft 11 is movable up and down in the vertical direction (Z axis direction) through the non-illustrated ball screw type servo mechanism.

In the above plate conveyance system, in general, on bringing the plate to be processed from the cassette 3 into the hand portion of the third arm 16 at the take-in place as well as on discharging the attracted plate 7 to the upper surface of the suction hand portion of the third arm 16 at the take-off place after conveyance to the predetermined position through the first, second and third arms 12, 14 and 16, the third arm 16 is required to transfer rectilinearly the attracted plate 7 on the hand portion thereof in a fixed direction, e.g. in the plate conveyance robot 4 of FIG. 9, in the X-axis direction by a predetermined distance L. Especially, in order to prevent such occurrence that, on one hand, in case of taking out the rectangular glass plate 7 from the loaded plate cassette 8 shown in FIG. 7, on the other hand, in case of staking the glass plate 7 into one of the unloaded plate cassettes 8, if one side of the glass plate 7 held on the suction hand portion of the third arm 16 collides against one of side walls of the cassette 8, this causes prevention of the send-out and send-in operations or the damage of the glass plate 7. Thus, it is necessary to keep making a rectilinear motion in horizontal position from the time it starts to take out the plate 7 to be conveyed from the loaded plate cassette 8 until the time the plate 7 held on the suction hand portion of the third arm 16 is completely moved out from the interior of the loaded plate cassette 8 as well as from the time it starts to taking the plate 7 conveyed into the unloaded plate cassette 8 until the time the plate 7 held on the suction hand portion of the third arm 16 is completely brought into the interior of the unloaded plate cassette 8.

the plate 7 held on the suction hand portion is completely moved out externally, and from the start of bringing into the unloaded cassette 8.

However, in the plate conveyance robot of the conventional type as described above, the first, second, and third arms 12, 14 and 16 are moved to make a predetermined link motion by the main shaft 11 driven by means of the electric servo motor so that the third arm 16 is extended only on the straight line parallel with the X axis of the rectangular coordinate system. Therefore, as shown in FIG. 6, in case of each pair of two plate cassettes 3, 3 and 5, 5 being located at the plate send-in and send-out places, in order to mate the longitudinal axis of the third arm 16 with the longitudinal axis of the plate 7 to be conveyed, another Y-axis rectilinear transfer mechanism like said X-axis rectilinear transfer mechanism is required, so that the plate conveyance robot becomes more complicated in overall construction and larger in overall dimension. In this manner, the plate conveyance robot 4 not only requires wide space for use or space for occupation but also at least one more transfer mechanism for activating the main shaft 11 in a fixed direction, for example, the Y-axis direction, thus involving a significant defect that the robot becomes larger in overall dimension and complicated in overall construction, and accordingly its manufacturing cost becomes more expensive.

Further, as the plate conveyance robot of the conventional type as above requires in most cases a Y-axis rectilinear transfer mechanism, thereby necessitating more and more larger transferring distance of the plate 7. Especially, in case of conveying the semiconductor plate for large scale integrated circuit (LSI) which is easily contaminated with floating dust in air, there is required a proportionally large scale cleaning equipment for prevention of contamination, which has been a defect.

OBJECT OF THE INVENTION

An object of the present invention is to provide a small sized and low cost plate conveyance robot which requires small occupation space or use space, by fully dissolving the various defects in the three joint type plate conveyance robot which is designed to convey a plate material, especially, a rectangular plate material in a horizontal plane from a first fixed position to a second fixed position while maintaining it in a horizontal position.

This object as well as other objects and advantages of the present invention will become apparent to those skilled in the art from the following description.

SUMMARY OF THE INVENTION

In order to achieve the above object, the present invention is characterized by providing a first and second driving motors on the first and second link mechanisms, respectively, and controlling in sequence the rotation angles of the main shaft driving motor and the first and second driving motors by the control unit, thereby allowing the third arm to travel rectilinearly a predetermined distance L on a horizontal plane in a fixed direction so as to take a plate to be conveyed into the suction hand portion of the third arm and to send out the plate from that suction hand portion when the predetermined conveyance operation is finished.

DETAILED DESCRIPTION OF THE INVENTION

A preferred embodiment of the present invention is illustrated with reference to the accompanying drawings.

Figure 1:
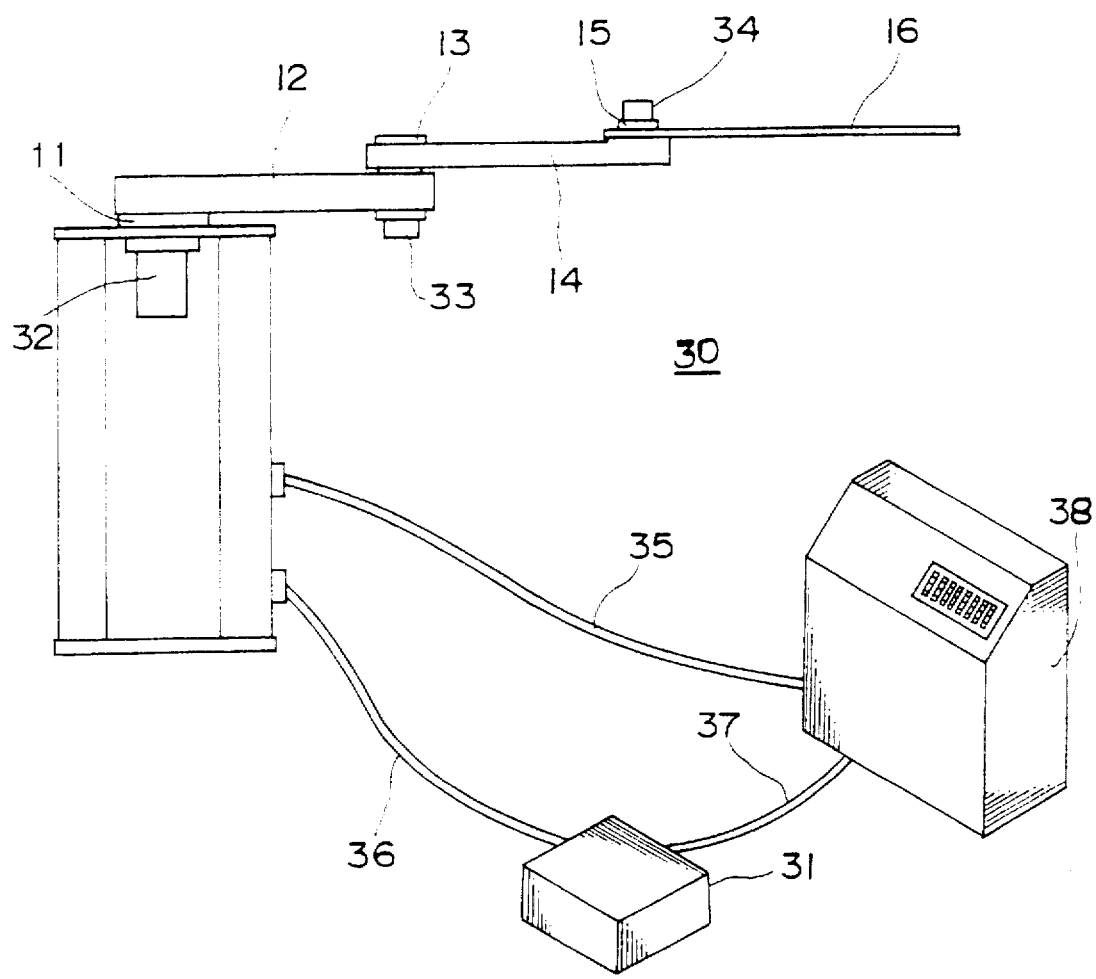
FIG. 1 is a schematic view showing the basic constitution of the plate material conveyance robot in an embodiment of the present invention.
Figure 8:
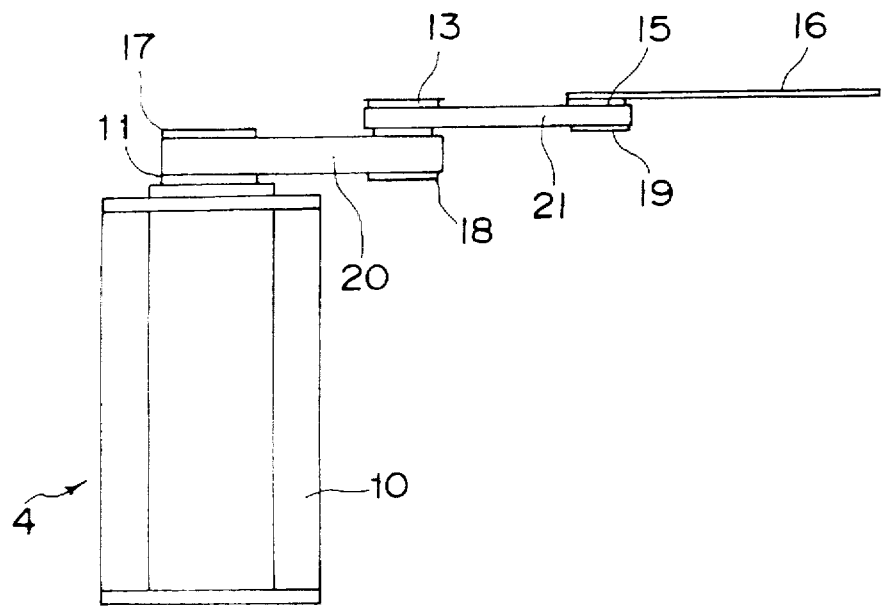
FIG. 8 is a side view of an example of the conventional type three joint type plate material conveyance robot.
Figure 9:
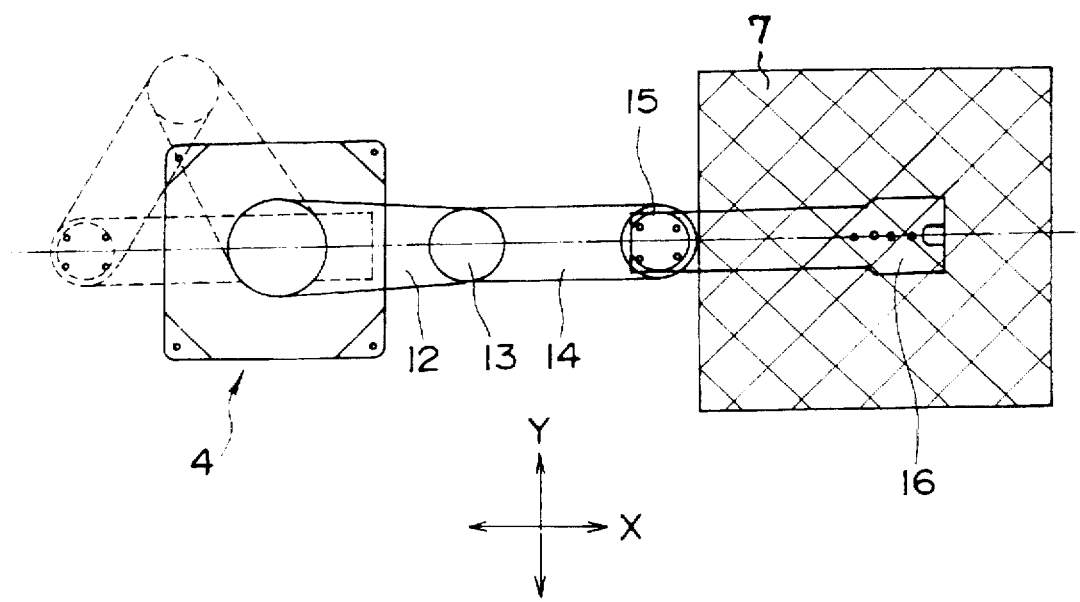
FIG. 9 is a plan view showing the plate material conveyance robot of FIG. 8.

As shown in FIG. 1, the plate material conveyance robot 30 of the present invention differs from the plate material conveyance robot 4 shown in FIGS. 8 and 9 above in the points of constituting the first and second link mechanisms 13 and 15 by using the first and second servo motors 33 and 34 whose rotation angles are automatically controlled by the electronic control unit in stead of the pulley mechanisms 18, 19 and belts 20, 21, and omitting or not necessitating the ball screw type transfer mechanism for rectilinearly transferring in the Y-axis direction in the rectangular coordinate plane expressed in the robot. Other parts of the robot are similar in construction to the above one. Those equivalent constituting parts are shown by the same numerical and alphabetical marks and explanation thereof omitted.

In FIG. 1, the first and second electric servo motors 33 and 34 and the electric servo motor 32 for driving in rotation the vertical main shaft 11 in the plate material conveyance robot 30 of the present invention are respectively connected to the electronic control circuit or unit 38 through the elastic electric cable 35. The vacuum suction holes 9 provided on the suction hand portion of the third arm 16 are connected to a vacuum pressure source 31 through the flexible air piping 36. The vacuum pressure source 31 is connected to the electronic control unit 38 through the non-illustrated known electromagnetic control valve and an electric cable 37.

Figure 6:
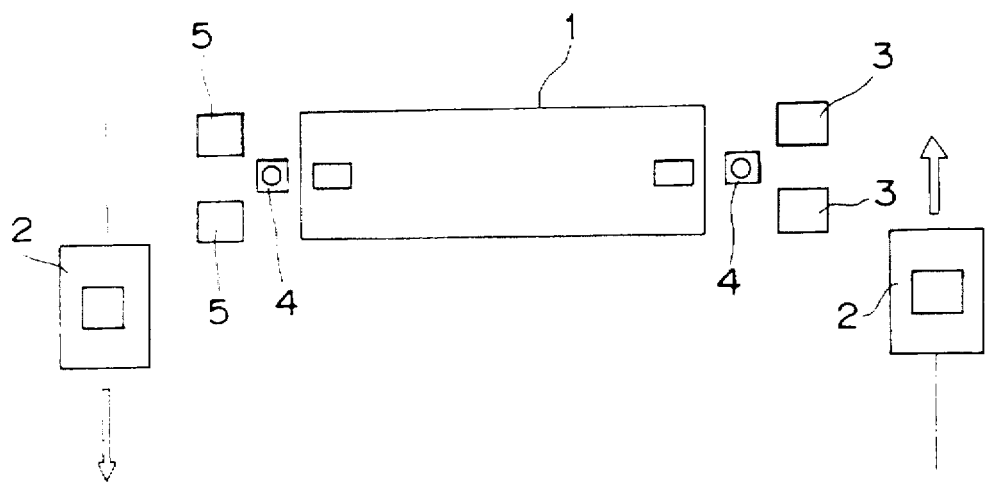
FIG. 6 is a layout view in the case where the plate material conveyance robot of the present invention is applied to the processing stage of the liquid crystal display manufacturing line.
Figure 7:
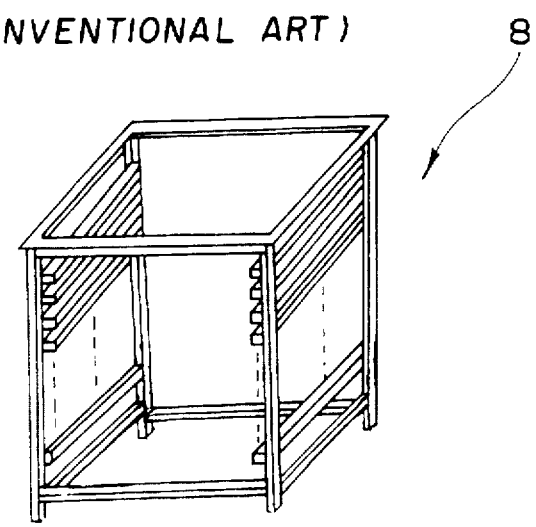
FIG. 7 is a perspective view of the appearance of the plate cassette applicable to the manufacturing line of FIG. 6.

Next, explanation is given on the controlling operation of the rotation angles of the electric servo motor 32 for driving in rotation the main shaft 11 and the first and second electric servo motors 33 and 34 in taking out a sheet of rectangular glass plate 7 for LCD from the loaded plate cassette 8 as shown in FIG. 7 and bringing it onto the suction hand portion of the third arm 16 in the robot 30 of the above constitution in the same manner as in FIG. 6.

Figure 2:
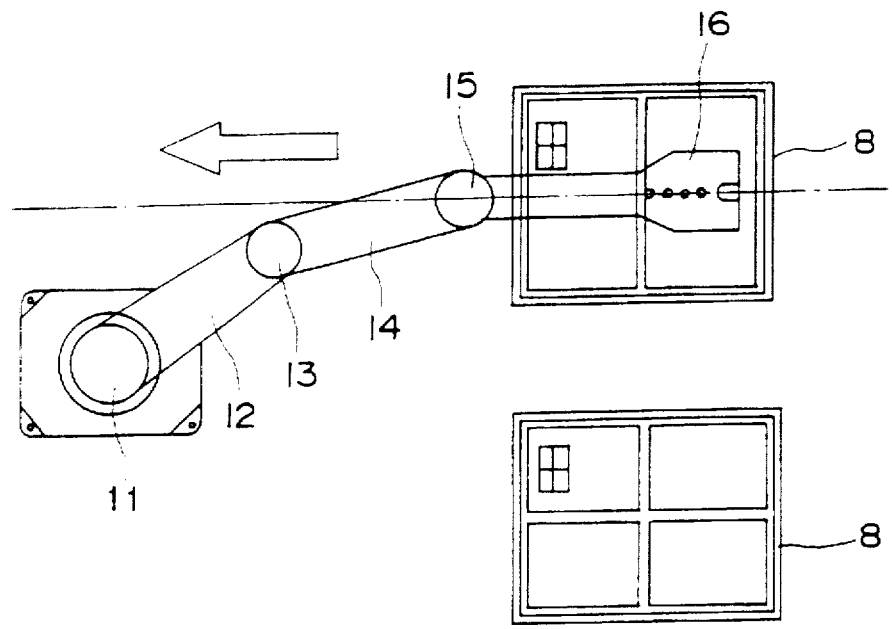
FIG. 2 is a view to illustrate the condition where the robot shown in FIG. 1 according to this invention take out a glass plate to be conveyed from the loaded glass plate cassette and attract it on the suction hand portion of the third arm of the robot.

First, as shown in FIG. 2, into an under position close to the lower surface of a glass plate 7 rested horizontally on a pair of ledges mounted in the plate cassette 8, the suction hand portion of the third arm 16 of the robot 30 is brought, and a vacuum pressure is applied to the suction holes of the suction hand portion of the third arm 16 through the piping 36 and the vacuum pressure source 31 to have the glass plate 7 attracted onto the vacuum head of the hand portion of the third arm 16. The sequence control of the rotation angles of the servo motors 32, 34 and 34 are carried out to move the suction hand portion of the third arm 16 into the interior of the unloaded plate cassette 8 in the completely reverse order to that of the sequence control of the following control operation.

Next, the rotation angles of the servo motors 32, 33 and 34 are controlled simultaneously and sequentially to have the third arm 16 rectilinearly move by a predetermined traveling distance L while holding the arm 16 horizontally in the X-axis direction in the rectangular coordinate plane expressed in the robot. The distance L is adjusted to correspond to the travel required to completely take out the plate 7 rested on the hand portion of the third arm 16 from the loaded plate cassette 8. Hereinafter, the rectilinear transferring distance L is called the X-axis stroke, either.

Figure 5:
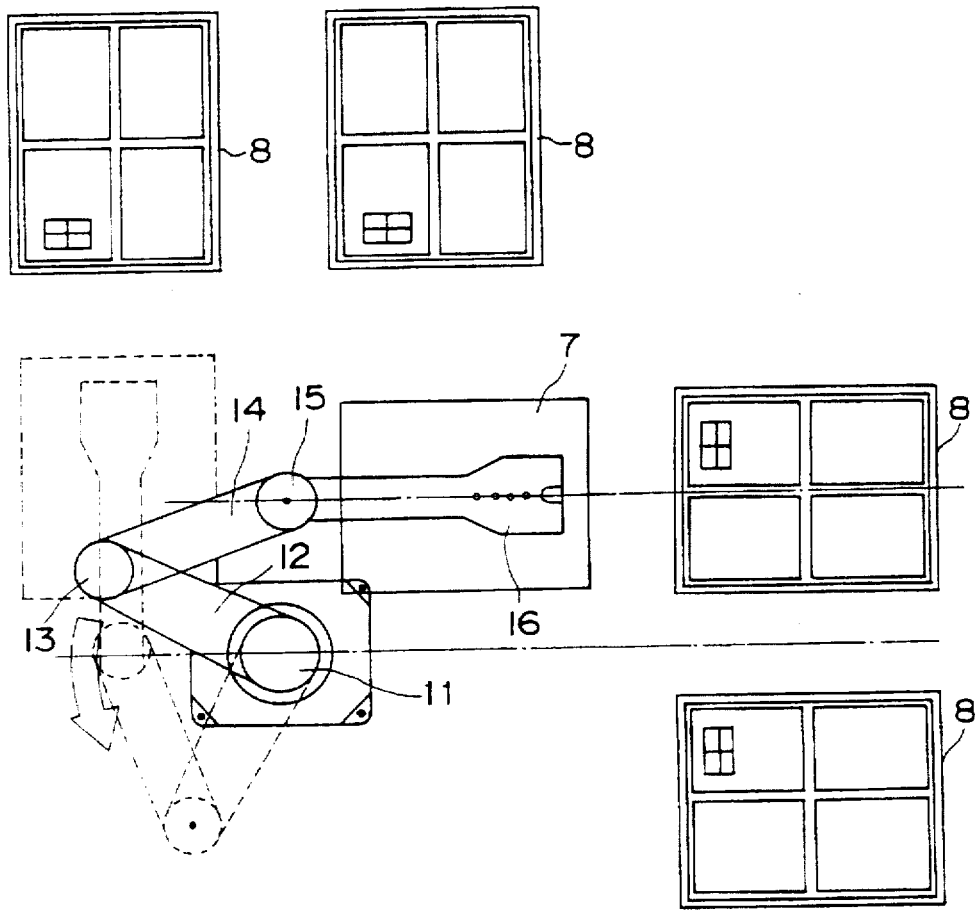
FIG. 5 is an illustrative view of another conveyance system using plate material conveyance robots according to the present invention.

The rotation angles of the servo motors 32, 33 and 34 are controlled in sequence by the first and second link mechanisms 13 and 15 so as to make angles $\theta_1$, $\theta_2$, and $\theta_3$ between the longitudinal axis of the first arm 12 and the fixed axis, i.e. the axis X in the embodiment of FIG. 5, the longitudinal axes of the first and second arms 12 and 14 and the longitudinal axes of the second and third arms 14 and 16 respectively, said values of the angles $\theta_1$, $\theta_2$, and $\theta_3$ being calculated sequentially, for example, at intervals of 0.1 second on the basis of numerical calculation by means of the computer and a set of mathematical equations shown in the following table 1.

TABLE 1

Figure 4:
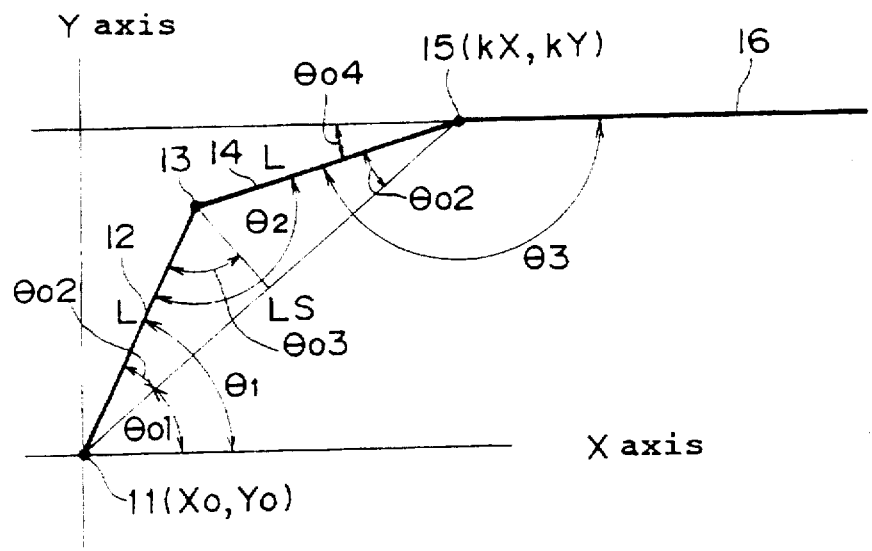
FIG. 4 is a geometric figure illustrating the amount required in controlling the rotation angles of the main shaft and the rotary shafts of the first and second link mechanisms in the rectangular coordinate plane of the robot of the present invention.

$\theta_{01} = \tan^{-1} [kY/kX]$ $\theta_{02} = \cos^{-1}[(1/2)Ls/L] = \cos^{-1}[1/2 \sqrt{kX^2 + kY^2} /L]$ $\theta_{03} = [\pi/2 - \theta_{02}]$
$\theta_{04} = [\theta_{01} - \theta_{02}]$
$\theta_1 = \theta_{01} + \theta_{02}$
$\theta_2 = \theta_{03} \times 2$
$\theta_3 = \pi - \theta_{04}$ In order to simplify the explanation on the rotation angle control operation of the servo motors 32, 33 and 34, it is assumed that the lengths of the first arm 12 and the second arm 14 are the same in FIG. 4. Also, in FIG. 4, the coordinates (kX, kY) correspond to the center point of the rotary shaft of the second link mechanism 15, and the coordinates (Xo, Yo) to the center point of the vertical main shaft 11.

As will be readily understood from the geometric in FIG. 4, when the connecting point between the third arm 16 and the second arm 14, i.e. the corresponding position in the coordinates (kX, kY) is determined, the angle $\theta_1$ made between center axis of the first arm 12 at the main shaft 11 and the axis X, the angle $\theta_2$ between the center axes of the first and second arms 12 and 14 in the first link mechanism 13, and the angle $\theta_3$ between the center axes of the second and third arms 14 and 16 in the second link mechanism 15 can be determined by means of calculation on the basis of the equations shown in Table 1. Accordingly, the angles $\theta_1$, $\theta_2$, and $\theta_3$ corresponding to the coordinates (kX, kY) of the points represented at equal intervals on the linear travel course of the third arm 16 are previously determined by means of numerical calculation and stored a set of values computed as above in the memory section of the electronic control unit 38, and in performing the sequential control of the rotation angles of the servo motors 32, 33 and 34, the computed values can be used in such a manner. By these steps, the control sequence can be effectively simplified without requiring the operation according to the above operation equation.

Figure 3:
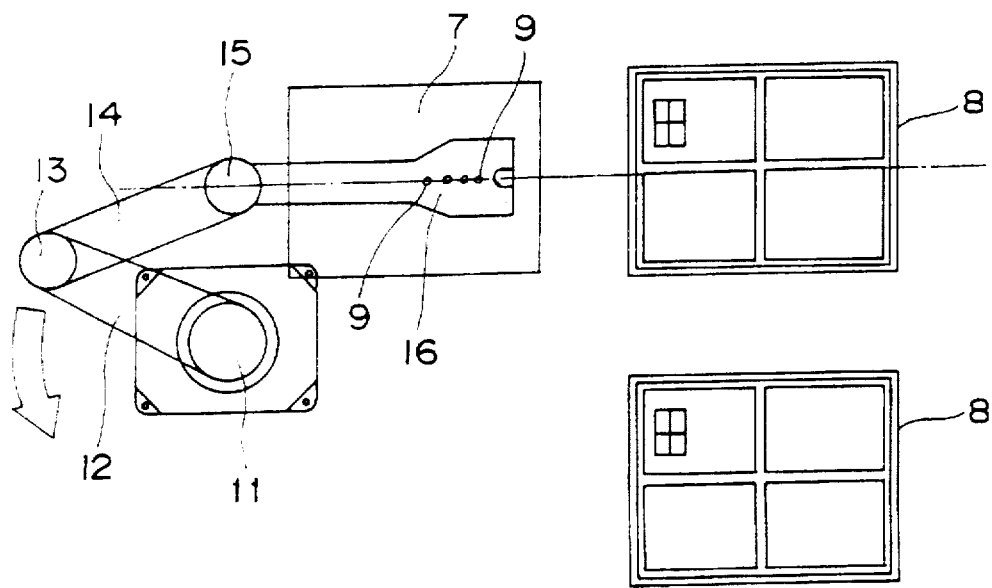
FIG. 3 is a view to illustrate the condition where the robot in FIG. 2 attracts the brought out glass plate on the upper surface of the suction hand portion of the third arm thereof and bring out entirely the third arm of the robot and the plate held thereon entirely from the interior of the plate cassette.

By controlling the servo motors 32, 33 and 34 at the same time in sequence as above, the third arm 16 holding the glass plate 7 can be linearly moved by the predetermined stroke L on the axis X in a horizontal plane into the position shown in FIG. 3.

Next, in case of conveying the glass plate 7 attracted to the hand portion of the third arm 16 into, for example, as shown in FIG. 6, a processing stage 1 which is at a position turned by 180 degrees from the loaded plate cassette 8 viewed from the main shaft 11 of the plate conveyance robot 30, the servo motor 32, accordingly, the main shaft 11, is rotated by 180 degrees. In case of sending the glass plate 7 held on the suction hand portion of the third arm 16 into the unloaded plate cassette 8 which is positioned at 90° to the loaded plate cassette 8, the main shaft 11, accordingly the servo motor 32, may be rotated by 90°. This state is shown in FIG. 6.

Next, by effecting sequential control simultaneously of the rotation angles of the servo motors 32, 33, and 34 in the same manner as described above, the plate 7 rested on the third arm 16 is moved into the charging area of the processing stage 1, and then application of a vacuum pressure to the suction hand portion of the third arm 16 is released to stop the clamp of the glass plate 7 on the suction hand portion of the third arm 16, thereby completing one cycle of conveyance the plate.

According to the plate conveyance robot of the present invention having the constitution as above, there are provided the drive motors for individually driving the main shaft and rotary shafts of first and second link mechanisms; the rotation angles of these three drive motors are controlled simultaneously and sequentially to move the third arm rectilinearly by a predetermined distance L in a predetermined direction in a horizontal plane; by which taking the plate to be conveyed into the suction hand portion of the third arm and discharging the plate held on the suction hand portion of the third arm into the fixed place after the transferring is performed. Consequently, in moving in the plate to be conveyed to the suction head of the third arm and moving out the plate from the suction hand portion after the transfer, without requiring the linear transfer in the direction of the axis Y as in the conventional type one, only the third arm, with the first and second arms bent to the third arm, can be linearly moved by the predetermined distance L in the predetermined direction. Accordingly, in the present invention robot, the use space or occupation space of the robot can be constricted more effectively than that of the conventional type. And, reduction in size and simplification of the whole robot can be effectively realized, and the manufacturing cost can be reduced.

What is claimed is:

1. A plate material conveyance robot comprising:
   a first arm, a first end being mounted horizontally on a vertical rotary main shaft through a journal bearing mechanism, rotated about a spindle of the bearing mechanism with a main shaft driving servo motor;
   a second arm rotatively connected at a first end thereof to a second end of said first arm in a horizontal position through a first link mechanism;
   a third arm rotatively connected at a first end thereof to a second end of said second arm in a horizontal position through a second link structure, said third arm having a suction hand portion at a free second end thereof, with a vacuum head provided to the suction hand portion; and a control unit for controlling the rotary actions of the vertical main shaft, first link mechanism, and second link mechanism and the action of the suction head, wherein after taking a sheet of plate into the suction hand portion of the third arm under an applied vacuum pressure from a first fixed place portion is sent to a second fixed place while maintaining the plate in a horizontal position, wherein first and second driving motors are provided on the first and second link mechanisms, respectively, and for at least a given period, immediately after loading said suction hand portion of the third arm with a sheet of plate at said first fixed place and just before unloading the plate held on the suction hand portion of the third arm at said second fixed place respectively, the rotation angular rates of the main shaft driving motor and the first and second driving motors are controlled in response to one another by the control unit to move the third arm rectilinearly in a horizontal position by a predetermined distance L in a fixed direction along a line which lies outside an axis of said main shaft in a horizontal plane, thereby allowing withdrawing of the third arm holding said plate from the first fixed place and approaching of the third arm loaded with the plate into the second fixed place in the respective horizontal position.

2. The plate material conveyance robot according to claim 1, wherein the main shaft driving motor and the first and second driving motors are electric servo motors.

3. The plate material conveyance robot according to claim 1 or 2, wherein the electronic control unit is composed of a microcomputer.

4. The plate material conveyance robot according to any one of claims 1 or 2, wherein there are carried into the first fixed place more than two loaded plate cassettes for storing rectangular plate materials in parallel with each other at a distance, with a vertical main shaft of the plate conveyance robot installed at a predetermined position between the first fixed place where the cassettes are arranged and the second fixed place where predetermined processing occurs, whereby the untreated rectangular plates stored in the cassettes are sent continuously in sequence through the conveyance operation of the robot from one of the cassettes at the first fixed place into a charging area of the second fixed place.

5. The plate material conveyance robot according to any one of claims 1 or 2, wherein there are located more than two unloaded plate cassettes for storing rectangular plate materials, positioned to lie in planes parallel with each other at a distance, with a vertical main shaft of the plate conveyance robot installed at a predetermined position between the first fixed place where predetermined processing occurs and a second fixed place where the unloaded cassettes are arranged, whereby the processed rectangular plates are continuously sent out in sequence from a discharging area of the first fixed place through the conveyance operation of the robot into one of the unloaded cassettes at the second fixed place.

6. The plate material conveyance robot according to claim 3, wherein there are carried into the first fixed place more than two loaded plate cassettes for storing rectangular plate materials in parallel with each other at a distance, with a vertical main shaft of the plate conveyance robot installed at a predetermined position between the first fixed place where the cassettes are arranged and the second fixed place where predetermined processing occurs, whereby the untreated rectangular plates stored in the cassettes are sent continuously in sequence through the conveyance operation of the robot from one of the cassettes at the first fixed place into a charging area of the second fixed place.

7. The plate material conveyance robot according to claim 3, wherein there are located more than two unloaded plate cassettes for storing rectangular plate materials, positioned to lie in planes parallel with each other at a distance, with a vertical main shaft of the plate conveyance robot installed at a predetermined position between the first fixed place where predetermined processing occurs and the second fixed place where the unloaded cassettes are arranged, whereby the processed rectangular plates are continuously sent out in sequence from a discharging area of the first fixed place through the conveyance operation of the robot into one of the unloaded cassettes at the second fixed place.

* * * * *